US006630532B1

(12) United States Patent
Eiden

(10) Patent No.: US 6,630,532 B1
(45) Date of Patent: Oct. 7, 2003

(54) MODIFIED STYRENIC BLOCK COPOLYMER COMPOUNDS HAVING IMPROVED ELASTIC PERFORMANCE

(75) Inventor: Keith Edward Eiden, Houston, TX (US)

(73) Assignee: Kraton Polymer U.S. LLC, Houston, TX (US)

( * ) Notice: Subject to any disclaimer, the term of this patent is extended or adjusted under 35 U.S.C. 154(b) by 0 days.

(21) Appl. No.: 09/657,015

(22) Filed: Sep. 7, 2000

Related U.S. Application Data

(60) Provisional application No. 60/154,118, filed on Sep. 15, 1999.

(51) Int. Cl.$^7$ ............................ C08L 53/02; C08K 5/01
(52) U.S. Cl. ..................... 524/505; 524/434; 524/486; 524/490; 524/491
(58) Field of Search .................. 525/98; 524/486, 524/490, 491, 474, 505

(56) References Cited

U.S. PATENT DOCUMENTS

| | | | | |
|---|---|---|---|---|
| 3,333,024 A | * | 7/1967 | Haefele et al. | 524/534 |
| RE27,145 E | * | 6/1971 | Jones | 525/98 |
| 3,810,957 A | * | 5/1974 | Lunk | 525/98 |
| 4,772,657 A | * | 9/1988 | Akiyama et al. | 524/474 |
| 4,785,043 A | * | 11/1988 | Kawai et al. | 525/98 |
| 4,861,819 A | * | 8/1989 | Theodore et al. | 524/490 |
| 5,068,138 A | | 11/1991 | Mitchell et al. | 524/505 |
| 5,093,422 A | | 3/1992 | Himes | 525/98 |
| 5,169,706 A | | 12/1992 | Collier, IV et al. | 428/152 |
| 5,216,074 A | * | 6/1993 | Imai et al. | 525/98 |
| 5,278,220 A | * | 1/1994 | Vermeire et al. | 524/490 |
| 5,304,599 A | | 4/1994 | Himes | 525/98 |

FOREIGN PATENT DOCUMENTS

| | | | | |
|---|---|---|---|---|
| WO | WO 98/21279 | 5/1998 | | C08L/53/02 |

OTHER PUBLICATIONS

PCT Examination Reports for PCT/EP00/09032 mailed Jan. 17, 2002.

* cited by examiner

*Primary Examiner*—Peter Szekely

(57) ABSTRACT

The present invention is an improved block copolymer composition for extruding films having excellent stress relaxation and increased retained tension or load at elevated temperatures. The compound is comprised of:

(a) from 52 to 60 percent by weight of a block copolymer having at least two polystyrene endblocks and a midblock of hydrogentated polymerized butadiene which has a vinyl content of 45 percent by weight or less (b) from 13 to 22 percent by weight of polystyrene, and (c) from 19 to 28 percent by weight of oil.

14 Claims, No Drawings

MODIFIED STYRENIC BLOCK COPOLYMER COMPOUNDS HAVING IMPROVED ELASTIC PERFORMANCE

This application claims the benefit of provisional application Ser. No. 60/154,118 filed Sep. 15, 1999.

FIELD OF THE INVENTION

The present invention relates to extruding of elastomeric polymer compositions, more specifically to such compositions that are extruded as films for use in disposable hygiene products such as adult, infant, and feminine hygiene products.

BACKGROUND OF THE INVENTION

Extrudable elastomeric compositions which can be easily made into elastic films having low stress relaxation, low hysteresis, and high recoverable energy are described in U.S. Pat. Nos. 4,663,220, 4,789,699, 4,970,259, or 5,093,422. Those elastomeric films are useful in making a variety of applications such as diaper waistbands and non-woven fabrics.

Polystyrene-poly(ethylene-butylene)-polystyrene elastomeric block copolymers (SEBS) and polystyrene-poly(ethylene-propylene)-polystyrene (SEPS) elastomeric block copolymers have been blended with other materials such as, for example, polyolefins, such as polypropylene and polyethylene, and oils to form extrudable elastomeric compositions which can be more easily extruded into elastic films having improved processing properties. While the additives improve the extrusion properties of the compositions and the processing properties of the elastic films, such additives have an adverse affect on the elastic properties of the resulting film, especially at temperatures above 25° C.

The currently used commercial SEBS-based compounds for elastomeric films generally have an average stress relaxation, when measured on a film in the direction that is transverse to the machine direction and tested at 100° F. (37.8° C.) at 150 percent elongation, of greater than 27 percent, and a retained tension or load of less than 105 psi. Measurement in the transverse direction is the most important because when the film is assembled into the final product, it is the direction that gets stressed. Since these films are mainly used in disposable hygiene products, they have to be able to retain their properties at body temperature when stressed. Stress relaxation refers to the percent loss of tension or load encountered after elongating an elastic material at a specified rate of extension to a predetermined length and is expressed as a percentage loss of the initial load encountered at a specified extension of the elastic material. For this application, the lower the stress relaxation the better, and higher retained tension or load, i.e. above 125 psi., will allow the use of thinner films.

SUMMARY OF THE INVENTION

The present invention is an improved block copolymer composition for extruding films having excellent stress relaxation and increased retained tension or load at elevated temperatures. The composition is comprised of:
(a) from 52 to 60 percent by weight of a block copolymer having at least two polystyrene endblocks and a midblock of hydrogenated polymerized butadiene (SEBS), having a polystyrene content of 14 to 25 percent by weight, a polystyrene block number average molecular weight of 7,000 to 11,000, a butadiene block number average molecular weight of 70,000 to 90,000, and a vinyl content of 45 percent by weight or less,
(b) from 13 to 22 percent by weight of polystyrene, and
(c) from 19 to 28 percent by weight of oil.

DETAILED DESCRIPTION OF THE INVENTION

The extrudable elastomeric composition of the present invention is an improvement of the extrudable compositions described in U.S. Pat. Nos. 4,970,259 and 5,093,422 which descriptions are incorporated by reference herein. The known compositions include one or more styrenic block copolymers, typically a polystyrene-poly(ethylene-butylene)-polystyrene (S-EB-S) or a polystyrene-poly(ethylene-propylene)-polystyrene (S-EP-S) elastomeric block copolymer which is produced by hydrogenating a polystyrene-polybutadiene-polystyrene or polystyrene-polyisoprene-polystyrene block copolymer. The extrudable compositions further comprise a polyolefin and an extending oil.

The styrenic block copolymers have at least two poly(monoalkenyl arene) blocks, preferably two polystyrene blocks, separated by a saturated block of polybutadiene (EB). The SEBS block copolymers of this invention comprise polystyrene endblocks each having a number average molecular weight of 7,000 to 11,000 and saturated polybutadiene midblocks having a number average molecular weight of 70,000 to 90,000. The saturated polybutadiene blocks must have a vinyl content of 45 percent by weight or less and a polystyrene content of 14 to 25 percent by weight.

The term "vinyl content" refers to the fact that a conjugated diene is polymerized via 1,2-addition (in the case of butadiene—it would be 3,4-addition in the case of isoprene). Although a pure "vinyl" group is formed only in the case of 1,2-addition polymerization of 1,3-butadiene, the effects of 3,4-addition polymerization of isoprene (and similar addition for other conjugated dienes) on the final properties of the block copolymer will be similar. The term "vinyl" refers to the presence of a pendant vinyl group on the polymer chain.

These polymers may be prepared using free-radical, cationic and anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet, or the like.

In general, when solution anionic techniques are used, conjugated diolefin polymers and copolymers of conjugated diolefins and alkenyl aromatic hydrocarbons are prepared by contacting the monomer or monomers to be polymerized simultaneously or sequentially with an organoalkali metal compound in a suitable solvent at a temperature within the range from about −150° C. to about 300° C., preferably at a temperature within the range from about 0° C. to about 100° C. Particularly effective anionic polymerization initiators are organolithium compounds having the general formula:

$$RLi_n$$

wherein R is an aliphatic, cycloaliphatic, aromatic, or alkyl-substituted aromatic hydrocarbon radical having from 1 to about 20 carbon atoms; and n is an integer of 1 to 4.

In addition to sequential techniques to obtain triblocks, at least anionic initiators can be used to prepare diblocks of polystyrene-polydiene having a reactive ("live") chain end on the diene block which can be reacted through a coupling agent to create, for example, (S-B)$_x$ Y structures wherein x is an integer from 2 to about 30, Y is a coupling agent, B is butadiene and greater than 65 percent of S-B diblocks are chemically attached to the coupling agent. Y usually has a molecular weight which is low compared to the polymers being prepared and can be any of a number of materials known in the art, including halogenated organic. compounds; halogenated alkyl silanes; alkoxy silanes; various esters such as alkyl and aryl benzoates, difunctional aliphatic esters such as dialkyl adipates and the like. Depending on the selected coupling agent the final polymer can be a fully or partially coupled linear triblock polymer (x=2). The coupling agent, being of low molecular weight, does not materially affect the properties of the final polymer.

It is not required in coupled polymers that the diblock units all be identical. In fact, diverse "living" diblock units can be brought together during the coupling reaction giving a variety of unsymmetrical structures, i.e., the total diblock chain lengths can be different, as well as the sequential block lengths of styrene and diene.

The styrenic block copolymers must be hydrogenated. In general, the hydrogenation or selective hydrogenation of the polymer may be accomplished using any of the several hydrogenation processes known in the prior art. For example the hydrogenation may be accomplished using methods such as those taught, for example, in U.S. Pat. Nos. 3,494,942; 3,634,594; 3,670,054; 3,700,633; and Re. 27,145, the disclosure of which patents are incorporated herein by reference. The methods known in the prior art and useful in the present invention for hydrogenating polymers containing ethylenic unsaturation and for hydrogenating or selectively hydrogenating polymers containing aromatic and ethylenic unsaturation, involve the use of a suitable catalyst, particularly a catalyst or catalyst precursor comprising an iron group metal atom, particularly nickel or cobalt, and a suitable reducing agent such as an aluminum alkyl.

In general, the hydrogenation will be accomplished in a suitable solvent at a temperature within the range from about 20° C. to about 100° C. and at a hydrogen partial pressure within the range from about 100 psig to about 5,000 psig, preferably about 100 psig. to 1,000 psig. Catalyst concentrations within the range from about 10 ppm (wt) to about 500 ppm (wt) of iron group metal based on total solution are generally used and contacting at hydrogenation conditions is generally continued for a period of time within the range from about 60 to about 240 minutes. After the hydrogenation is completed, the hydrogenation catalyst and catalyst residue will, generally, be separated from the polymer.

The compound of this invention contains from 52 to 60 percent by weight of the above block copolymer. It is important that the total amount of polymer in the compound be between 52 to 60 percent by weight of the compound. If this condition is not satisfied, then the compound will have stress relaxation values greater than 27 percent when the polymer content is below 52 percent and the compound will not be processable into thin films (0.001–0.020 inches thick) when the polymer content is above 60 percent.

The compound should contain from 13 to 22 percent by weight of polystyrene because it is compatible with the styrene end blocks of the polymer, which helps to increase the retained tension or load, and it also aids in the processing of the final compound. The polystyrene used in the compound of the present invention may be one which has a number average molecular weight of from 150,000 up to about 400,000, most preferably 200,000 to 300,000, and a melt flow index from 1 to 18, preferably 1 to 7, ASTM D1239, condition G.

The amount of oil used in the compound ranges from 19 to 28 percent by weight because it aids in the processing of the final compound and helps reduce the amount of stress relaxation. If the oil content is not within this range, then the stress relaxation will be greater than 27 percent when the percentage of oil is less than 19 percent and the retained tension or load will be below 105 psi when greater than 29 percent. Oils which can be used are those which are compatible with the elastomeric mid-block segment of the elastomeric block copolymer and which do not tend to go into the aromatic endblock portions to any significant degree. Thus, the oils can be viewed as paraffinic. Paraffinic oils which may be used in the elastomeric composition should be capable of being melt processed with other components of the elastomeric composition without degrading. Particularly important is the ability of the final composition to be melt extruded. An exemplary extending oil is a white mineral oil available under the trade designation Drakeol 34 from the Pennzoil Company Pennreco Division. Drakeol 34 has a specific gravity of 0.864–0.878 at 60° F., a flash point of 460° F., and viscosity of 370–420 SUS at 100° F. Suitable vegetable oils and animal oils or their derivatives may also be used as the extending oil.

While the principal components of the extrudable elastomeric composition used to form the elastic sheet have been described in the foregoing, such extrudable elastomeric composition is not limited thereto, and can include other components not adversely affecting the extrudable elastomeric composition attaining the stated objectives. Exemplary materials which could be used as additional components would include, without limitation, pigments, antioxidants, stabilizers, surfactants, waxes, flow promoters, solvents, particulates, and materials added to enhance processability and pellet handling of the composition.

The term "elastic" is used herein to mean any material which, upon application of a biasing force, is stretchable, that is, elongatable to at least 400 percent of its relaxed unbiased length and which will recover to within 140 percent of its original unbiased relaxed length upon release of the stretching, elongating force. A hypothetical example would be a one (1) inch sample of a material which is elongatable to at least 5.00 inches and which, upon being elongated to 5.00 inches and released, will recover to a length of not more than 1.40 inches. Many elastic materials may be elongated by much more than 400 percent of their relaxed length, for example, elongated 400 percent or more, and many of these will recover to substantially their initial relaxed length, for example, to within 140 percent of their initial relaxed length, upon release of the stretching force.

As used herein, the term "stress relaxation" refers to the percent loss of tension or load between the maximum load or force encountered after elongating an elastic material at a specified rate of extension to a predetermined length (or the load or force measured at some initial length) and the remaining load or force measured after the sample has been held at that length for a specified period of time, for example, from about 0 minutes to about 60 minutes. Except where otherwise noted for the present invention, stress relaxation is expressed as a percentage loss of the initial load encountered at a specified extension of an elastic material. The stress relaxation is determined by calculating the difference between the initial maximum load measured after elongating an elastic material in the transverse direction at a rate of 20 inches per minute to an elongation of 150 percent (i.e., to 150 percent of the material's initial width) and the remaining load measured after that sample was held at that width for 60 minutes divided by the initial maximum load at that width. Testing may be performed on an Instron Model 5565 Universal Test Machine specimens based on ASTM D882. Stress relaxation after 60 minutes at, for example, an elongation of 150 percent (i.e., to 150 percent of the material's initial width) may be expressed as a percentage utilizing the following equation:

stress relaxation=(peak load$_{150\%}$–load$_{150\%}$@ 60 min)/(peak load$_{150\%}$)*100.

As used herein, the "number average molecular weight" was determined utilizing gel permeation chromatography techniques for linear anionic polymers. All molecular weights are measured prior to hydrogenation which will increase the molecular weights by a small amount.

As used herein, the polystyrene content of a block copolymer refers to the weight of polystyrene in the block copolymer. It is calculated by dividing the sum of molecular weight of all polystyrene blocks by the total molecular weight of the block copolymer.

EXAMPLES

Example 1

Block copolymer A was made by standard solution anionic techniques followed by hydrogenation. The molecular weights of the blocks of this SEBS polymer were 9,200-72,300-9,400. Its vinyl content was 38 percent and its total styrene content was 20.2 percent.

Compound 1 was made by preblending 57.79 percent Block Copolymer A with 17.26 percent Chevron EA3000 polystyrene having a melt flow of 1.8 grams/10 min. and a number average molecular weight of about 300,000 and 24.08 percent Drakeol 34. This preblend was then extruded on a Baker Perkins MPC/V-50 MKIII compounding line (which consists of a 32 mm co-rotating twin screw side feeder and a 75 mm crosshead extruder) at 425° F. (218° C.). The finished Compound 1 was then cast into 0.0025–0.0035 inch thick films on a Killion 30:1 KL100 1 inch extruder with a 10 inch film die. The die temperature was 420° F.–450° F. (216° C.–232° C.). The stress relaxation and retained tension or load of the cast film sample based on the Compound 1 was measured by the procedure described above. The results are shown in Table 3 below.

Example 2 and Comparative Examples 3 and 4

Example 2 and Comparative Examples 3 and 4 were prepared as described in Example 1 with the exception that a styrenic resin, Hercules PiccolasticO D125, was used in Comparative Example 3 instead of polystyrene EA300. Polymers A and B are SEBS block copolymers within the scope of the present invention. Polymers C and D are comparative examples of commercial SEBS block copolymers, which have been used to make films. The polymers and formulations used for Examples 1 and 2 and Comparative Example 3 and 4 are shown in Tables 1 and 2. The molecular weight is expressed in terms of the molecular weights of the different blocks of the polymers.

TABLE 1

| Polymer | MW (x1000) | Vinyl Content (% wt) | PSC (% wt) |
|---|---|---|---|
| A | 9.2-72.3-9.4 | 38 | 20.2 |
| B | 10-76.4-10 | 38 | 21.6 |

TABLE 1-continued

| Polymer | MW (x1000) | Vinyl Content (% wt) | PSC (% wt) |
|---|---|---|---|
| C | 10-47-10 | 38 | 31 |
| D | 7-34.5-7 | 38 | 30 |

TABLE 2

| Compound Formulation, % | 1 | 2 | Comparative 3 | Comparative 4 |
|---|---|---|---|---|
| Polymer A | 57.79 | | | |
| Polymer B | | 57.90 | | |
| Polymer C | | | 24.02 | |
| Polymer D | | | 36.04 | 58.3 |
| Drakeol 34 Oil | 24.08 | 23.45 | 27.03 | 29.2 |
| 1.8 MFI Polystyrene | 17.26 | 17.78 | | 11.7 |
| Styrenic Resin | | | 12.01 | |
| Antioxidant | 0.87 | 0.87 | 0.9 | 0.9 |

The results of the stress relaxation tests are shown in Table 3 below. It can be seen that the retained tension or load of the compounds which fall within the scope of the present invention, Compound 1 and Compound 2, are above 125 psi and higher than the formulations which are outside the scope of the present invention, Comparative Compounds 3 and 4. It can also be seen that the stress relaxation of Compound 2 is considerably less than the other formulations.

TABLE 3

| Sample | Initial Load @150% Elongation @100° F., psi. | Retained Load @150% Elongation @100° F. after 60 minutes, psi. | Stress Relaxation @150% Elongation @100° F. after 60 min. (transverse direction) |
|---|---|---|---|
| Compound 1 | 179.67 | 132.3 | 26.38% |
| Compound 2 | 196.36 | 152.7 | 22.22% |
| Comparative Compound 3 | 144.71 | 104.9 | 27.5% |
| Comparative Compound 4 | 150.71 | 116.0 | 23.04% |

Example 7 and Comparative Examples 5, 6, 8 and 9

In this experiment, another series of test on other compound formulations varying percentages of polymer B were performed. The compounds shown in Table 4 were prepared by the procedure described in Example 1.

TABLE 4

| Compound FORMULATION, % | C5 | C6 | 7 | C8 | C9 |
|---|---|---|---|---|---|
| Polymer B | 48.65 | 51.85 | 54.55 | 60.44 | 63.29 |
| Mineral Oil | 25.71 | 24.93 | 24.90 | 20.13 | 15.25 |
| 1.8 MFI Polystyrene | 24.92 | 22.44 | 19.73 | 18.51 | 20.00 |
| Antioxidant | 0.72 | 0.78 | 0.82 | 0.92 | 0.96 |

The compounds in Table 4 were cast into films and the stress relaxation and the retained tension or load were measured by the procedures described above. It can be seen in Table 5 that when the percentage of polymer B is greater than 60 percent (Comparative Compounds 8 and 9), the compound cannot be processed into a film, and when the percentage of polymer B is less than 52 percent (Comparative Compounds 5 and 6), the stress relaxation is greater than 27 percent. The retained tension or load on Compound 7 (within the scope of the invention) is significantly higher than 125 psi. and the stress relaxation is considerably less than 27 percent.

TABLE 5

| Sample | Initial Load @150% Elongation, @100° F., psi. | Retained Load @150% Elongation, @100° F. after 60 min. | Stress Relaxation @150% Elongation @100° F. after 60 min. (transverse direction) |
|---|---|---|---|
| C5 | 240.55 | 162.9 | 32.27% |
| C6 | 241.27 | 167.7 | 30.48% |
| 7 | 176.31 | 136.2 | 22.73% |
| C8 | Unable to cast into film | Unable to cast into film | Unable to cast into film |
| C9 | Unable to cast into film | Unable to cast into film | Unable to cast into film |

Comparative Examples 10–13

In this experiment, a series of compounds were made using polymer B. The percentage of polymer B was constant and the percentages of polystyrene and oil were varied. The compounds in Table 6 were prepared by the procedure described above.

TABLE 6

| FORMULATION, % | C10 | C11 | C12 | C13 |
|---|---|---|---|---|
| Polymer B | 57.90 | 57.90 | 57.90 | 57.90 |
| Mineral Oil | 18.45 | 13.45 | 28.45 | 33.45 |
| 1.8 MFI Polystyrene | 22.78 | 27.78 | 12.78 | 7.78 |
| Antioxidant | 0.87 | 0.87 | 0.87 | 0.87 |

The compounds in Table 6 were cast into films and the stress relaxation and the retained tension or load were measured by the procedures described above. It can be seen in Table 7 that when the percentage of oil is below 19 percent and the percentage of polystyrene is greater than 22 percent (Clo), the stress relaxation is greater than 27 percent even though the retained tension or load was significantly greater than 125 psi. When the percentage of oil is above 28 percent and the percentage of polystyrene is below 13 percent (C12 and C13), the stress relaxation is significantly below 27 percent and the retained load is the same as Comparative Examples 3 and 4 or less. It also shows that when the percentage of oil goes below 14 percent and the percentage of polystyrene is greater than 27 percent (C11), the compound cannot be processed into film.

TABLE 7

| Sample | Initial Load @150% Elongation @100° F., psi. | Retained Load @150% Elongation, @100° F., psi. | Stress Relaxation @150% Elongation, @100° F. (transverse direction) |
|---|---|---|---|
| C10 | 265.07 | 187.3 | 29.34% |
| C11 | Unable to cast into film | Unable to cast into film | Unable to cast into film |
| C12 | 135.7 | 107.3 | 20.91% |
| C13 | 95.41 | 79.6 | 16.55% |

What is claimed is:

1. An elastomeric film grade thermoplastic polymer composition having improved elastic performance, consisting essentially of:
    (a) from 52 to 60 percent by weight of a block copolymer having at least two polystyrene endblocks and a midblock of a hydrogenated polybutadiene, which has a vinyl content of 45 percent by weight or less;
    (b) from 13 to 22 percent by weight of polystyrene; and
    (c) from 19 to 28 percent by weight of paraffinic/naphthenic oil.

2. The composition of claim 1, wherein the block copolymer has a molecular weight between 60,000 and 120,000 and a polystyrene content between 10 to 30 percent by weight, wherein at least 80 percent of the butadiene double bonds are hydrogenated.

3. The composition of claim 1, wherein the block copolymer is a styrene-butadiene-styrene triblock copolymer with a molecular weight between 80,000 and 110,000 and a polystyrene content of between 14 to 25 percent by weight, a polystyrene block number average molecular weight of between 7,000 to 11,000 for each endblock, and a butadiene block number average molecular weight of between 70,000 and 90,000, wherein at least 90 percent of the butadiene double bonds are hydrogenated.

4. The composition of claim 1, wherein the from 13 to 22 percent by weight of polystyrene has a number average molecular weight of between 150,000 to 400,000, and a melt index less than 20 grams/10 minutes.

5. The composition of claim 1, wherein the oil has a flash point greater than 450° F. (232° C.) and a specific gravity greater than 0.860.

6. An elastomeric film grade thermoplastic polymer composition having improved elastic performance, consisting essentially of:
    (a) from 52 to 60 percent by weight of a block copolymer having at least two polystyrene endblocks of molecular weight between 7,000 to 11,000 and a midblock of hydrogenated polymerized butadiene of number average molecular weight between 70,000 to 90,000 which has a vinyl content of 45 percent by weight or less;
    (b) from 13 to 22 percent by weight of polystyrene with a number average molecular weight of between 200,000 to 400,000, and a melt index of between 1 to 10 grams/10 minutes; and
    (c) from 19 to 28 percent by weight of a paraffinic/naphthenic oil with a flash point greater than 450° F. (232° C.) and a specific gravity greater than 0.860.

7. The composition of claim 6, wherein the block copolymer has a polystyrene endblock content from about 10 to about 30 percent by weight and at least 80 percent of the butadiene double bonds are hydrogenated.

8. The composition of claim 6, wherein the block copolymer has a polystyrene endblock content from about 14 to about 25 percent by weight and at least 90 percent of the butadiene double bonds are hydrogenated.

9. An elastomeric film grade thermoplastic polymer composition having improved elastic performance, consisting essentially of:
 (a) from 52 to 60 percent by weight of a block copolymer comprising:
  from about 10 to about 30 percent by weight polystyrene endblocks, wherein the polystyrene has a number average molecular weight from about 7,000 to about 11,000 for each endblock; and
  a midblock of a hydrogenated polybutadiene, which has a vinyl content of 45 percent by weight or less and a number average molecular weight from about 70,000 and about 90,000;
 (b) from 13 to 22 percent by weight of polystyrene; and
 (c) from 19 to 28 percent by weight of a paraffinic/naphthenic oil.

10. The composition of claim 9, wherein at least 80 percent of the butadiene double bonds are hydrogenated.

11. The composition of claim 9, wherein the block copolymer has a polystyrene content from about 14 to about 25 percent by weight.

12. The composition of claim 9, wherein at least 90 percent of the butadiene double bonds are hydrogenated.

13. The composition of claim 9, wherein the polystyrene has a number average molecular weight from about 150,000 to about 400,000 and a melt index less than 20 grams/10 minutes.

14. The composition of claim 9, wherein the oil has a flash point greater than 450° F. (232° C.) and a specific gravity greater than 0.860.

* * * * *